L. GIBBS.
EMBROIDERY HOOP.
APPLICATION FILED SEPT. 23, 1912.
1,059,143.
Patented Apr. 15, 1913.
2 SHEETS—SHEET 2.
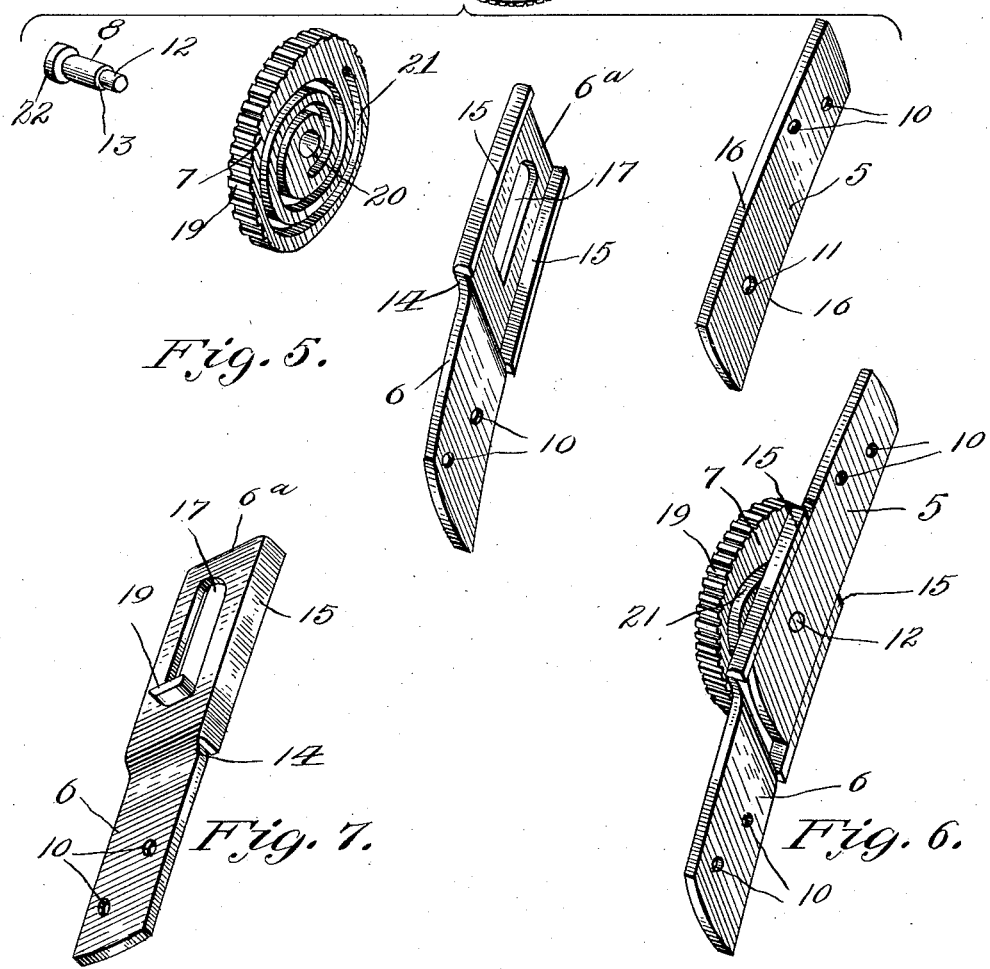
Witnesses
Philip A. H. Terrell
Elfriede Schmidt.
Inventor
Lewis Gibbs
By Harry Frease
Attorney

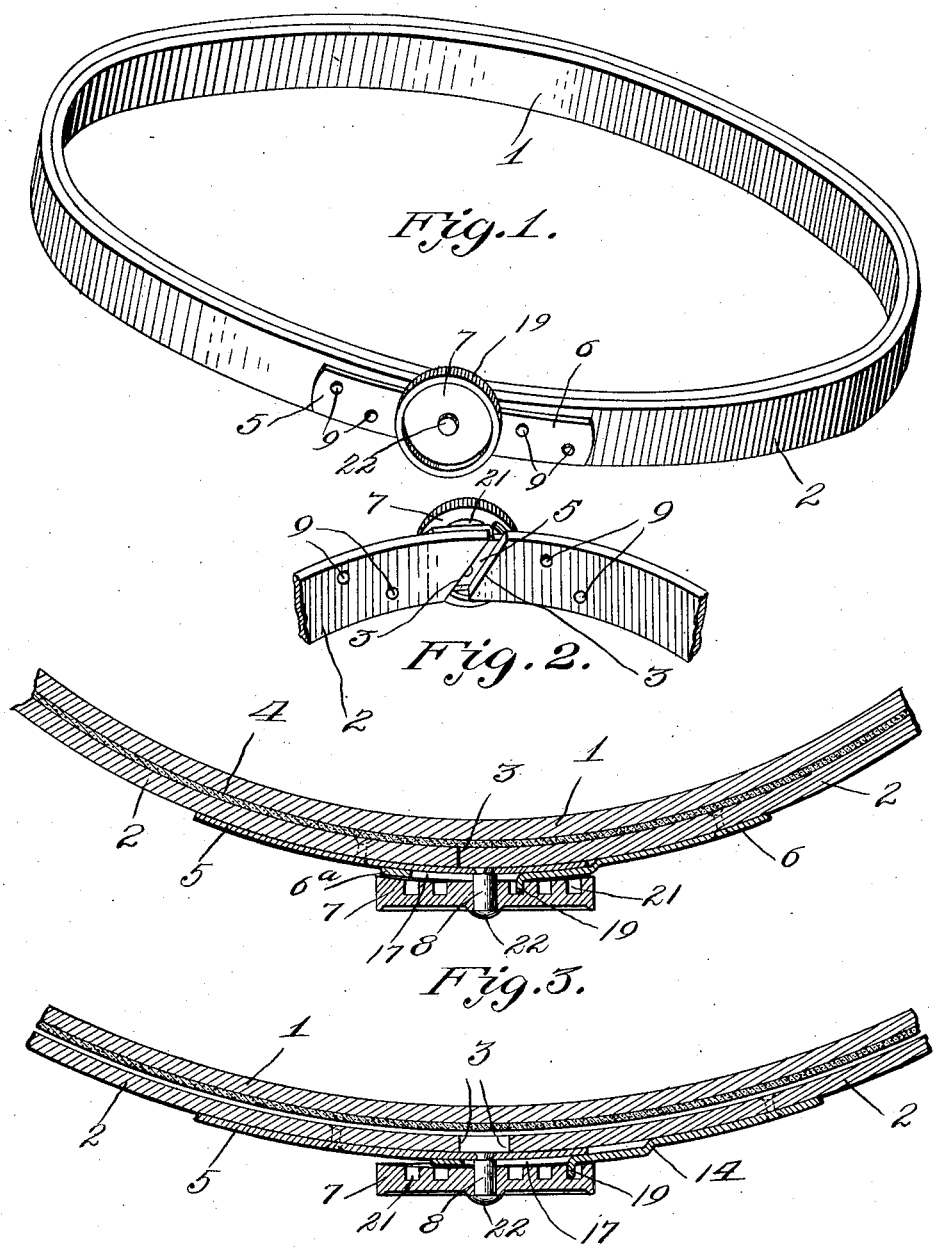

UNITED STATES PATENT OFFICE.

LEWIS GIBBS, OF CANTON, OHIO, ASSIGNOR TO THE GIBBS MANUFACTURING COMPANY, OF CANTON, OHIO, A CORPORATION OF OHIO.

EMBROIDERY-HOOP.

1,059,143.

Specification of Letters Patent.

Patented Apr. 15, 1913.

Application filed September 23, 1912. Serial No. 721,779.

*To all whom it may concern:*

Be it known that I, LEWIS GIBBS, a citizen of the United States, residing at Canton, in the county of Stark and State of Ohio, have invented a new and useful Improvement in Embroidery-Hoops, of which the following is a specification.

The invention relates to a hoop composed of two rings, one telescoping within the other, by means of which a piece of linen or other fabric is stretched and held for embroidering or other work, and to that particular class of hoops, in which one of the rings is cut and the severed ends thereof are connected together by adjusting means; and the object of the improvement is to provide connecting means of this character which can be readily and economically made and applied to the end portions of the severed hoop, which will positively hold the severed ends of the hoop in opposed relation and in circumferential alinement, which will not expose any mechanism or present any protruding parts for interfering with or being caught by the fabric or the embroidering materials, and finally, which will permit a wide range of expansion and contraction of the severed hoop and at the same time will enable the same to be firmly held or secured in any desired position of adjustment.

In short, it is proposed by the present invention to avoid or overcome the uncertain action and limited range of adjustment of embroidery hoops having the ends of the severed rings connected together by adjusting springs, or having one of the rings itself composed of a yielding structure or material; and furthermore to extend the limited range of adjustment and the localized holding action of the type of hoops in which the opposing ends of the severed rings are connected together by ordinary cam devices; and finally to avoid or overcome the difficulties of manufacturing and using embroidery hoops wherein the ends of a severed ring are either overlapped or are connected by devices which intervene between the severed ends when the same are circumferentially alined.

The objects and purposes of the invention, thus set forth in general terms, are attained by the construction, mechanism and arrangement of a preferred embodiment thereof, illustrated in the accompanying drawings, forming part hereof, in which—

Figure 1, is a perspective view of an embroidery hoop composed of two rings, showing the improved connecting devices applied to the outer ring thereof; Fig. 2, a fragmentary inside view of the outer ring showing the severed ends thereof and the improved connecting devices applied thereto; Fig. 3, a fragmentary circumferential section of the hoop, with a fabric intervening between the rings, and showing the severed-end joint of the outer ring in contracted or closed relation; Fig. 4, a similar view, showing the severed-end joint of the outer ring in expanded or open relation; Fig. 5, a perspective view of the several parts of the connecting devices in relative position for assembling; Fig. 6, a perspective view of the connecting devices assembled and riveted together; Fig. 7, a detached perspective view of the guide member; and Fig. 8, an inner side view of the disk wheel showing the spiral groove therein.

Similar numerals refer to similar parts throughout the drawings.

The continuous inner ring 1, and the severed outer ring 2 are preferably made of wood or other comparatively inelastic material, and the severing of the outer hoop is preferably made on a diagonal line so as to form the inclined ends 3, which inclination prevents, as much as may be, the entrance of the fabric into the varying interval between the ends.

The connecting devices for the ends of the severed ring include the tongue plate 5, the guide plate 6, the disk wheel 7, and the pivot post 8; the tongue plate 5 and the guide plate 6, being suitably secured, as by the rivets 9, to the adjacent end portions of the severed ring, said rivets being passed through the apertures 10 provided for that purpose, in the remote end portions of the plates.

The tongue plate 5 lies flatwise around the periphery of the severed ring, and is preferably extended beyond the end portion thereof to which it is connected, so as to bridge the interval between the several ends of the ring when the same is fully expanded to the open position, as shown in Fig. 4; and the tongue plate 5 is furthermore provided with the aperture 11 for receiving the rivet pin 12 on the end of the pivot post 8, which rivet pin is preferably made of less diameter than the pivot post, thus forming the annular shoulder 13 for bearing against the outer side of the tongue plate around the aperture 11 therein when the end of the pin 12 is riveted on the inner side of the tongue plate.

The unsecured end portion 6ª of the guide plate 6 is arranged to overlap and lie flatwise along a corresponding portion of the tongue plate 5, the guide plate being reversely bent outward at 14 to accommodate the thickness of the tongue plate; and the overlapping portion 6ª of the guide plate is furthermore provided with the inturned lateral flanges 15 which neatly embrace the side edges 16 of the tongue plate and serve to hold the two plates in slidable alinement with each other. The overlapping portion 6ª of the guide plate is furthermore provided in the median line with the longitudinal slot 17, which receives and accommodates the movements of the pivot post 8; and on the outer side of the overlapping portion of the guide plate is provided the radial tongue or post 19, which is located at or near the inner end of the longitudinal slot, and as shown in Fig. 7, is preferably formed by deflecting directly outward a portion of the material from the end portion of the slot.

The disk wheel 7, is preferably made with a serrated or roughened periphery 19, and is provided with the axial bearing 20 for the pivot post 8, on which pivot post the wheel is adapted to rotate. The inner side of the disk wheel 7 is furthermore provided with the spiral groove 21 preferably extending two or more times around the wheel, in which groove the radial tongue or post 19 is entered and operates when the parts are assembled and secured together.

The parts are assembled and secured together by passing the pivot post 8 through the disk wheel bearing 20, and the guide-plate slot 17, and then riveting the post-pin 12 in the corresponding tongue plate aperture 11. The length of the pivot post 8 is so proportioned that the head 22 thereof will hold the disk wheel and the overlapping portions of the guide-plate and the tongue-plate closely together, but without any clamping action, when the pin of the pivot post is riveted in the aperture of the tongue plate, thus permitting a free rotation of the disk wheel on the pivot post and a free sliding of the overlapping portion of the connecting plates on each other.

With the parts thus assembled and secured together, it is evident that by a rotation of the disk wheel, the operation of the radial tongue in the spiral groove serves to expand or contract the circumferential length of the severed ring according to the direction the disk wheel is rotated; and furthermore, the inclination of the extended spiral groove from a circular line is so slight, that the radial tongue will be firmly held in any given position of adjustment.

I claim:

1. An embroidery hoop composed of two rings adapted to be telescoped, one of the rings being severed to form opposing ends, and connecting means for the severed ends including a plate secured on the side of one end, a second plate secured on the side of the other end and extended to overlap the first plate, there being lateral flanges on one plate slidably engaging the edges of the other plate and there being a longitudinal slot in the overlapping portion of the second plate and a radial tongue thereon at the end of the slot, a pivot post on the first plate extending through the slot of the second plate, and a wheel rotatably secured on the pivot post and having a spiral groove therein operatively engaged with the radial tongue.

2. Connecting means for the ends of an embroidery-hoop ring including a plate on one end, a second plate on the other end extended to overlap the first plate, there being lateral flanges on one plate slidably engaging the edges of the other plate and there being a longitudinal slot in the overlapping portion of the second plate and a radial tongue thereon at one end of the slot, a pivot post on the first plate extending through the slot of the second plate, and a wheel rotatably secured on the pivot post, and having a spiral groove therein operatively engaged with the radial tongue.

LEWIS GIBBS.

Witnesses:
ELFRIEDE SCHMIDT,
PHILIP A. H. TERRELL.

---

Copies of this patent may be obtained for five cents each, by addressing the "Commissioner of Patents, Washington, D. C."